United States Patent [19]

Proksa et al.

[11] 4,442,070

[45] Apr. 10, 1984

[54] APPARATUS FOR THE PRODUCTION OF A FLOWABLE REACTION MIXTURE

[75] Inventors: Ferdinand Proksa, Leverkusen; Hans-Michael Sulzbach, Koenigswinter; Reiner Raffel, Siegburg, all of Fed. Rep. of Germany

[73] Assignee: Maschinenfabrik Hennecke GmbH, Leverkusen, Fed. Rep. of Germany

[21] Appl. No.: 359,632

[22] Filed: Mar. 18, 1982

[30] Foreign Application Priority Data

Mar. 26, 1981 [DE] Fed. Rep. of Germany ....... 3111957

[51] Int. Cl.$^3$ .................... B01J 5/04; B01J 15/02; B01S 14/00
[52] U.S. Cl. .................... 422/133; 222/149; 222/267; 222/406; 222/527; 252/359 E; 264/39; 264/51; 366/96; 425/543; 425/817 R
[58] Field of Search ............... 141/107; 222/137, 149, 222/267, 280, 290, 406, 527; 366/96, 132, 134, 138, 174, 189, 192; 422/133; 425/130, 257, 4 C, 466; 252/359 E; 239/546, 547, 141, 222, 366, 422, 425, 252; 264/51, 54, DIG. 83; 137/67, 244, 577, 245, 245.5

[56] References Cited

U.S. PATENT DOCUMENTS

| | | | |
|---|---|---|---|
| 2,890,836 | 6/1959 | Gusmer et al. | 239/117 |
| 3,220,801 | 11/1965 | Rill, Jr. et al. | 23/252 |
| 3,264,067 | 8/1966 | Alderfer | 422/133 X |
| 3,690,800 | 9/1972 | Schwab et al. | 264/DIG. 83 X |
| 3,761,213 | 9/1973 | Wight | 425/466 X |
| 3,982,724 | 9/1976 | Citrin | 222/46 X |
| 4,030,640 | 6/1977 | Citrin et al. | 141/117 X |
| 4,141,470 | 2/1979 | Schulte et al. | 425/257 X |
| 4,188,356 | 2/1980 | Weber et al. | 264/51 X |
| 4,226,543 | 10/1980 | Schülter | 422/224 X |
| 4,256,679 | 3/1981 | Osinski et al. | 264/DIG. 83 X |
| 4,378,335 | 3/1983 | Boden et al. | 422/133 |
| 4,389,375 | 6/1983 | Proksa et al. | 366/159 X |
| 4,399,104 | 8/1983 | Coblenz et al. | 422/133 X |

FOREIGN PATENT DOCUMENTS 2360891 6/1974 Fed. Rep. of Germany ...... 366/134

Primary Examiner—S. Leon Bashore, Jr.
Assistant Examiner—Brion P. Heaney
Attorney, Agent, or Firm—Gene Harsh; Joseph C. Gil

[57] ABSTRACT

The present invention relates to an apparatus for the production of a flowable reaction mixture of at least two flowable components which mixture forms a foam or solid material, comprising:
 (a) storage means for said components;
 (b) supply lines leading from the storage means via metering pumps to a mixing head;
 (c) said mixing head having a mixing chamber;
 (d) injection openings connected to said supply lines and opening into said mixing chamber;
 (e) said mixing chamber having an outlet opening downstream of said injection openings;
 (f) said outlet opening having an elastic outlet tube whose throughflow cross section may be varied connected thereto; said apparatus further characterized in that:
 (g) the outlet tube has at least one means associated therewith for deflecting said outlet tube;
 (h) an ejection piston is associated with said outlet tube, which piston is capable of filling the outlet tube; the contour of the inside wall of said outlet tube corresponding to the external contour of said ejection piston.

8 Claims, 22 Drawing Figures

APPARATUS FOR THE PRODUCTION OF A FLOWABLE REACTION MIXTURE

The present invention relates to an apparatus for the production of a flowable reaction mixture from at least two flowable components which forms foam or solid material.

BACKGROUND OF THE INVENTION

An apparatus for the production of a flowable reaction mixture comprising reservoirs for the reaction components, supply lines with metering pumps leading from said reservoirs to a mixing head which has a mixing chamber, injection openings connected to said supply lines and opening into said mixing chamber, and an outlet opening to which is connected an elastic sleeve whose cross section may be varied is known from U.S. Pat. No. 3,220,801. In that apparatus, the pressure in the mixing chamber, which affects the size of the cells of the foam which is forming, is adjusted by changes in the throughflow cross section of the outlet tube leading from the mixing chamber. A small pressure chamber between the outlet tube and a supporting pipe around it is charged with a compression agent, pressing the tube against the ring shoulders projecting from the supporting pipe which create the chamber, thus reducing the cross section of the tube.

This apparatus is not economical for high speed molding, however, since rinsing procedures would be necessary between the individual filling operations. The apparatus may only be used for applications operating continuously for a long time, such as block foam installations or double conveyor belt installations.

An object of the present invention is to provide an apparatus for producing a flowable reaction mixture which may be easily cleaned and which allows the pressure in the mixing chamber to be controlled and the reaction mixture to issue from the outlet pipe in a laminar flow. This is particularly important when introducing the reaction mixture into molding tools in order to avoid the harmful impact of air and to achieve a closed flow front which expands as evenly as possible.

In the apparatus according to the present invention, the throughflow cross section of the outlet tube may be adjusted by laterally deflecting the outlet tube during the mixing phase, as a result of which, the pressure in the mixing chamber may be controlled. Further, as a result of the deflection of the outlet tube, even while retaining the throughflow cross section, a flow path may be formed such that the flow is substantially stabilized in the outlet pipe. An additional advantage is realized since remnants of mixture may be removed from the outlet tube using an ejection piston, as in the case of known ejection piston mixing heads having rigid outlet pipes (U.S. Pat. Nos. 2,890,836 and 4,141,470).

DESCRIPTION OF THE INVENTION

Figure 1:
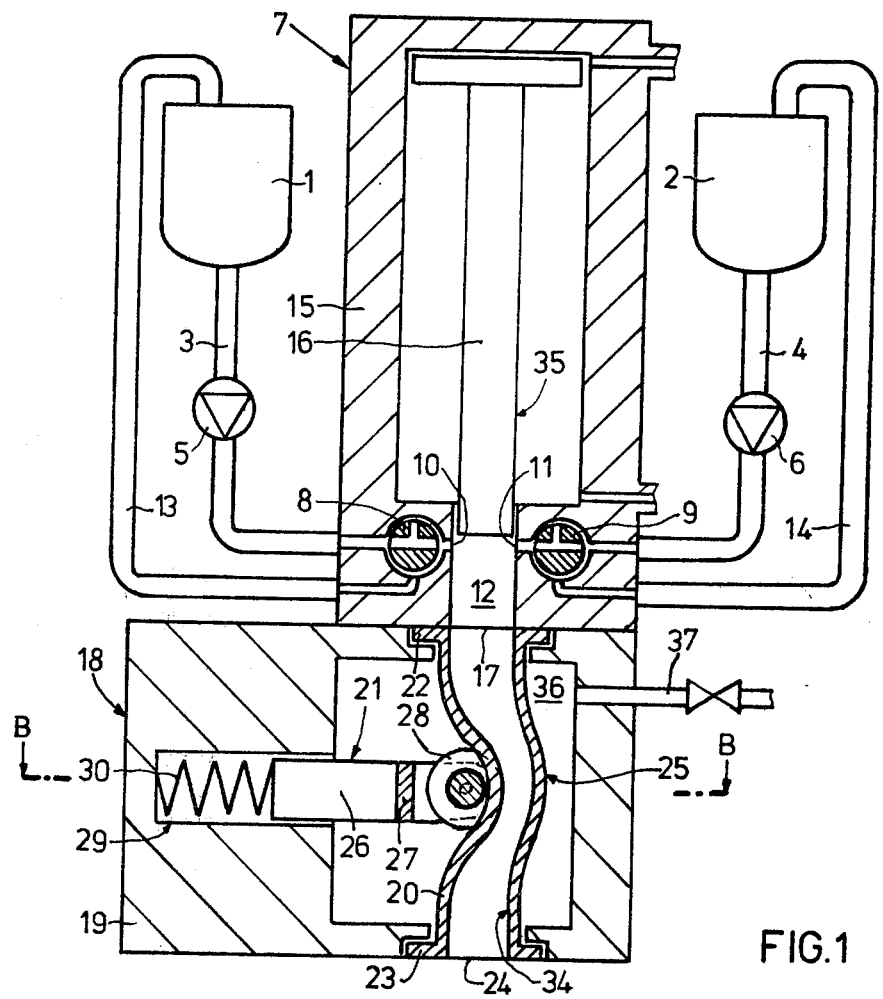
FIG. 1 represents a first embodiment of the present invention with an ejection piston mixing head and an outlet tube positioned in the extension of the mixing chamber axis during the mixing phase.

The present invention relates to an apparatus for the production of a flowable reaction mixture from at least two flowable components which mixture forms a foam or solid material, comprising:
  (a) storage means for the components;
  (b) supply lines leading from the storage means via metering pumps to a mixing head;
  (c) said mixing head having a mixing chamber;
  (d) injection openings connected to the supply lines and opening into said mixing chamber;
  (e) said mixing chamber having an outlet opening downstream of said injection openings;
  (f) said outlet opening having an elastic outlet tube whose throughflow cross section may be varied connected thereto;
characterized in that:
  (g) the outlet tube has at least one means associated therewith for deflecting said outlet tube;
  (h) an ejection piston is associated with said outlet tube which piston is capable of filling the outlet tube; the contour of the inside wall of the outlet tube corresponding to the external contour of the ejection piston.

According to two different embodiments of the present invention, the outlet tube may be positioned on the longitudinal axis of the mixing chamber or it may be connected to the outlet opening of the mixing chamber at an angle to the mixing chamber. In the first case, the ejection piston also fills the mixing chamber during the cleaning phase and in the second case, the mixing chamber is provided with its own separate cleaning piston. The configurations of the outlet tube are similar, in the first case, to the configuration of the apparatus in U.S. Pat. No. 4,141,470 and, in the second, to the apparatus of U.S. Pat. No. 3,975,128.

A deflection device which acts externally to the elastic outlet tube with pressure or traction and holds the tube in the desired position during the mixing phase is preferably associated with the outlet tube. According to a first suitable embodiment, the deflection device in its rest position pushes against the outlet tube and is forced back by the forward force of the ejection piston at the start of the cleaning cycle. According to a second embodiment, the deflection device is connected to the control device of the apparatus and is controlled by contact switches, optionally with the aid of time delay relays, in dependence on the movement of the ejection piston. The control device itself is not subject matter of the present invention. Its design would be apparent to the routineer in this art. Before the start of the mixing phase in the second embodiment, the deflection device has to be brought into its working position, so that it presses against the outlet tube or deflects it by traction. Then, at the start of the cleaning phase, the return movement of the deflection device is initiated by another contact switch, so that this device does not act on the outlet tube when the ejection piston enters the outlet tube.

The deflection device preferably comprises a transversely-displaceable rammer which is driven, for example, by mechanical means (e.g., by spring force), or by hydraulic, pneumatic or electromagnetic means. The head of the rammer coming into contact with the tube is advantageously exchangeable, with each head surface designed according to the desired deformation of the outlet tube. The head may also support a profiled roller. Also, the stroke width of the rammer is advantageously adjustable in order to be able to influence the degree of deflection.

According to one suitable embodiment of the present invention, the deflection device may comprise a rocker arm. In this case, the only difference is that the linear movement of the rammer is replaced by the pivotal movement of the rocker arm. A double rocker arm design is particularly preferred, with the rotary shaft of the arm extending transversely through the central axis of the outlet tube in the cleaning phase and each end of the arm carrying a head having a contact surface or a roller. When the double rocker arm is engaged, an S-shaped deflection of the outlet tube is obtained.

A further embodiment of the apparatus is characterized in that the deflection device comprises a supported pressure chamber having a compression agent connection piece, the pressure chamber only partly surrounding the outlet tube. When compared with the previously known embodiment of an outlet tube which may be charged by a pressure chamber according to U.S. Pat. No. 3,220,801, a major difference is seen in the fact that both a constriction and/or a deflection (so that the path is deformed) may be achieved in the outlet tube.

In another embodiment, a bend, which corresponds to the required shape of the outlet tube in the mixing phase, is molded into an outlet tube having a certain basic rigidity. In this case, the outlet has its original, unstressed shape in the mixing phase, and is then straightened from that normal shape by the ejection piston during the cleaning phase. To achieve this, for example, the necessary basic rigidity may be achieved by varying the wall thickness of the tube or by adding ribs which are molded externally onto the tube.

According to another embodiment, the outlet tube has one or more sections of greater radial extensibility. The extensibility may also be distributed over the complete circumference of the section.

The extensibility is designed such that, during the mixing phase, a bulge is formed under the pressure of the issuing mixture and at the end of the mixing phase, the tube returns, by the inherent elasticity of the section, to a position such that any remnants of mixture on the tube wall will be stripped away during the forward movement of the ejection piston in the cleaning phase. The bulge may be controlled by supports from the supporting pipe or by a device which is similar to the deflection device and which exerts single point or all-round pressure on the intermediate section. A traction device is recommended for a localized bulge. A vacuum chamber surrounding the intermediate section is recommended for controlling a uniformly-distributed radial bulge.

Rubber and polyurethane elastomers of suitable extensibility are suitable as materials for the outlet tube. The material must be sufficiently strong against the alternating stresses which occur. The internal wall of the tube must be as smooth as possible in order to prevent a film of reaction mixture adhering thereto. The inside wall may optionally be coated with materials which have an anti-adhesive effect, good slide properties and a high wear-resistance, such as silicon and polytetrafluoroethylene. An internal liner of the material may also be used instead of the coating.

The outlet tube is appropriately positioned in a housing which is designed such that it may be easily exchanged, if required.

The extent of deflection and the deformation during the mixing phase depends on many factors such as, for example, throughput, pressure in the mixing chamber, viscosity of the reaction mixture, size of the throughflow cross section and length of the outlet tube. The optimum shapes can be empirically determined.

The new apparatus is illustrated schematically in the drawings in several embodiments and will be explained in more detail in the following.

Figure 2:
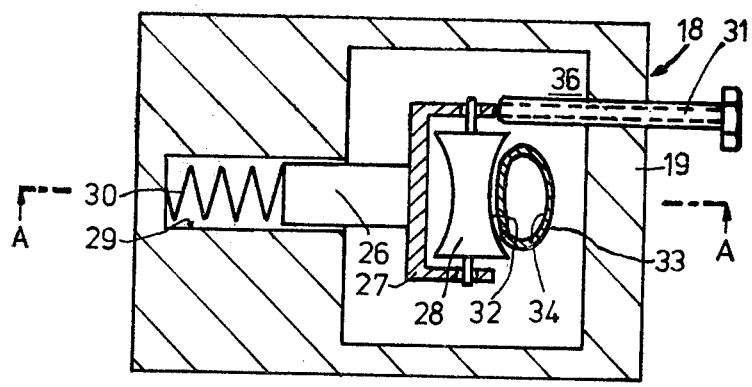
FIG. 2 is a view of FIG. 1 along plane B—B.
Figure 3:
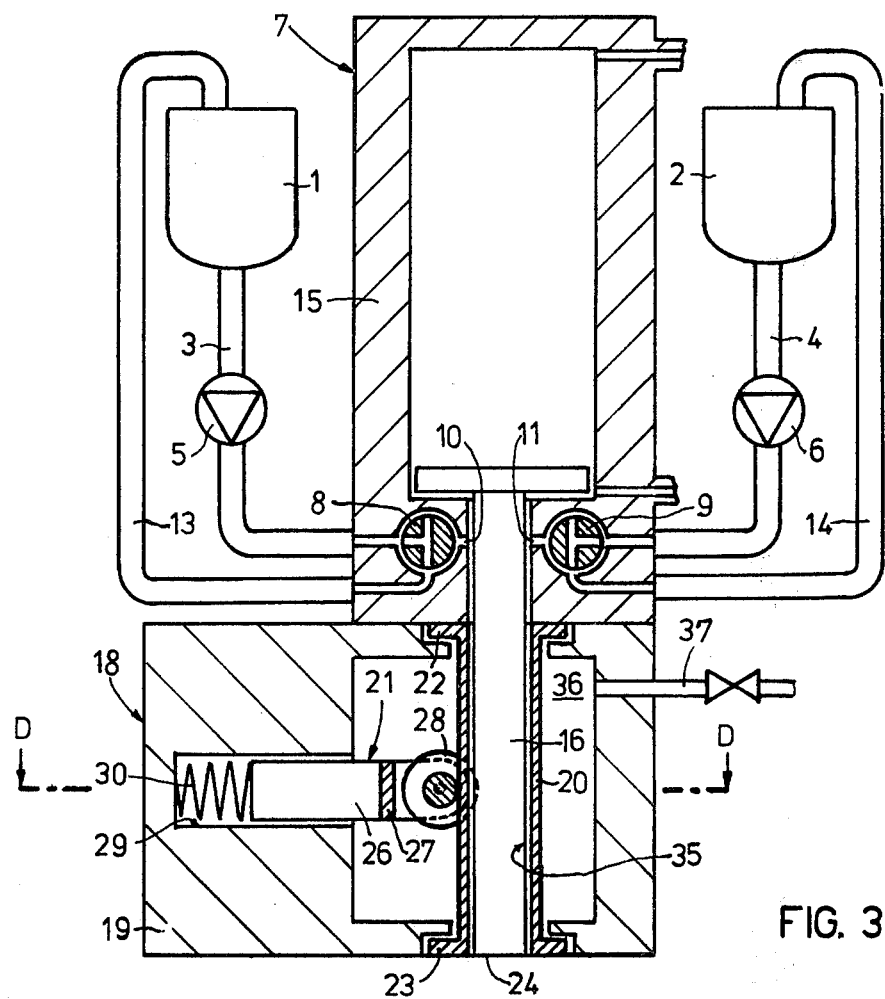
FIG. 3 represents the apparatus of FIG. 1 during the cleaning phase.
Figure 4:
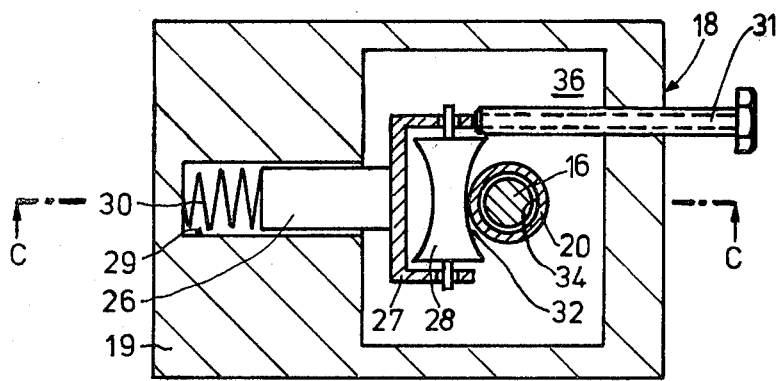
FIG. 4 is a view of FIG. 3 along plane D—D.

In the embodiment of FIGS. 1 to 4, supply lines 3 and 4 lead from reservoirs 1 and 2 via metering pumps 5 and 6 to a mixing head 7. The components flow through inlet openings 10 and 11 via reversing valves 8 and 9 during the mixing phase (FIG. 1) into the mixing chamber 12 of a mixing head 7. However, in the cleaning phase (FIG. 3) the components are guided into return lines 13 and 14 by the reversing valves 8 and 9. A hydraulically operated ejection piston 16 is guided in the housing 15 of the mixing head 7 and this piston releases the inlet openings 10 and 11 in the mixing phase (FIG. 1). An outlet part 18 is connected to the outlet opening (FIG. 1) of the mixing chamber 12. This outlet part 18 comprises a housing 19, an elastic outlet tube 20 and a deflection device 21. The outlet tube is firmly clamped in the housing 19 by means of its flanges 22 and 23, but in an easily-exchangeable manner. Its outlet opening 24 opens into a molding tool (not shown). The outlet tube is made of an abrasion-proof, flexible polyurethane elastomer which may be subjected to high alternating stresses and is coated inside with a layer of silicon. In FIGS. 1 and 2, the outlet tube 20 has a deflection 25, as compared with its straight form in the cleaning phase (FIGS. 3 and 4), which is caused by the deflection device 21. The deflection device 21 essentially comprises a rammer 26, the exchangeable head 27 of which carries a contoured roller 28. The rammer 26 is guided in a bore 29 of the housing 19. It abuts against a compression spring 30 positioned in the bore 29 which presses it against the outlet tube 20. The stroke of the rammer 26 is manually adjustable by the stop 31 (FIGS. 2 and 4) in order that the outlet tube 20 undergoes the required deflection. The concave contour 32 (FIGS. 3 and 4) of the roller 28 simultaneously causes a required deformation 33 (FIG. 2) in the outlet tube 20, so not only is the flow path of the mixture curved, but also the flow cross section is constricted. At the end of the mixing procedure, the ejection piston 16 occupies a position according to FIG. 3. Upon entering the cavity of the outlet tube 20, the forward force of the ejection piston 16 predominates over the force of the compression spring forcing the rammer 26 back such that during this phase, the roller 28 remains in external contact with the outlet tube 20 (FIGS. 3 and 4). In this position of the ejection piston 16, the inside wall 34 of the outlet tube 20 adopts the circumferential contour 35 of the piston. In addition, the chamber surrounded by the housing 19 is designed as a pressure chamber 36, which is associated with a compression agent supply connection piece 37. During the mixing phase, the pressure chamber 36 is charged with compressed air in order to support the outlet tube 20 externally. The pressure prevailing in the pressure chamber 36 substantially corresponds to that of the reaction mixture flowing through the outlet tube 20, so that an equilibrium is obtained.

Figure 5:
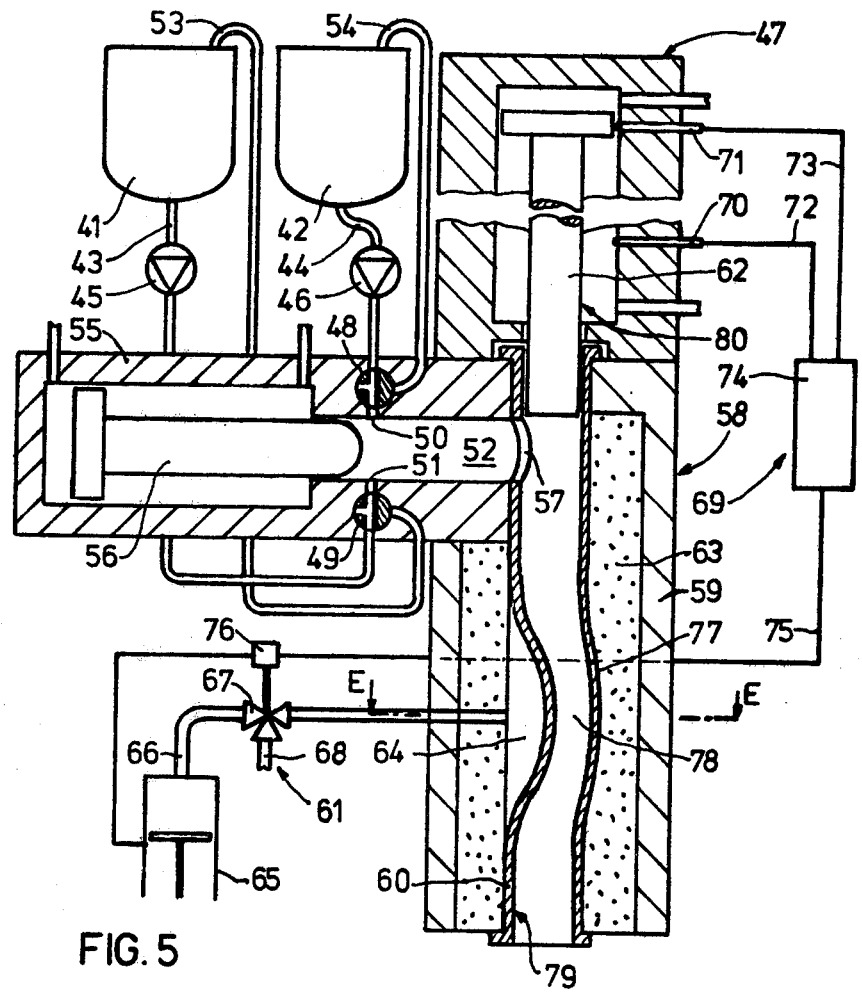
FIG. 5 represents a second embodiment of the present invention with an ejection piston mixing head and an outlet tube positioned at a right angle to the axis of the mixing chamber during the mixing phase.

In the embodiment of the apparatus according to FIGS. 5 to 8, supply lines 43 and 44 lead from reservoirs 41 and 42 via metering pumps 45 and 46 to a mixing head 47. The components flow through inlet openings 50 and 51 into the mixing head 47 via two-way valves 48 and 49 during the mixing phase (FIG. 5). However, in the cleaning phase (FIG. 7), the components are guided into the return lines 53 and 54 by the two-way valves 48 and 49. An hydraulically driven ejection piston 56 is guided in the housing 55 of the mixing head 47 and releases the inlet openings 50 and 51 in the mixing phase (FIG. 5).

The outlet opening of the mixing chamber 52 is denoted by reference number 57. An outlet part 58 is arranged at a right angle to the housing 55 of the mixing head 47. This outlet part 58 comprises a housing 59, an outlet tube 60, a deflection device 61 and another ejection piston 62 which may be driven hydraulically and is guided in the housing 59. The outlet tube 60 is made of rubber. It is provided with an internal liner of polytetrafluoroethylene (not shown) and is externally supported by a packing 63 of semi-flexible foam with which it is bonded, except at one point. A pneumatic pressure chamber 64 is provided at this point which, together with a compressor 65, a supply line 66, a shut-off and deaerating valve 67 and a deaerating connection piece 68 make up the deflection device. The valve 67 may be adjusted by a control device 69 which is indicated in a purely schematic manner. It comprises contact switches 70 and 71, from which electrical connectors 72 and 73 lead to a control relay 74 which is connected to a servo-motor 76 via a pulse line 75, to operate the valve 67 and the compressor 65. It is obvious that the two-way valves 48 and 49 and the ejection pistons 56 and 62 are coordinated with each other in their operation via a control device (not shown).

Figure 6:
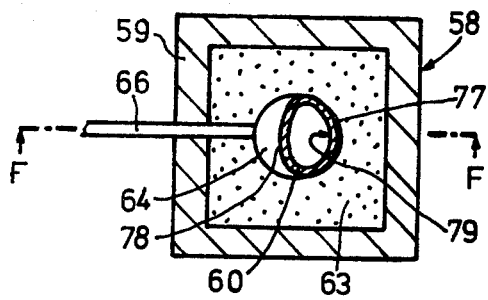
FIG. 6 is a view of FIG. 5 along plane E—E.
Figure 7:
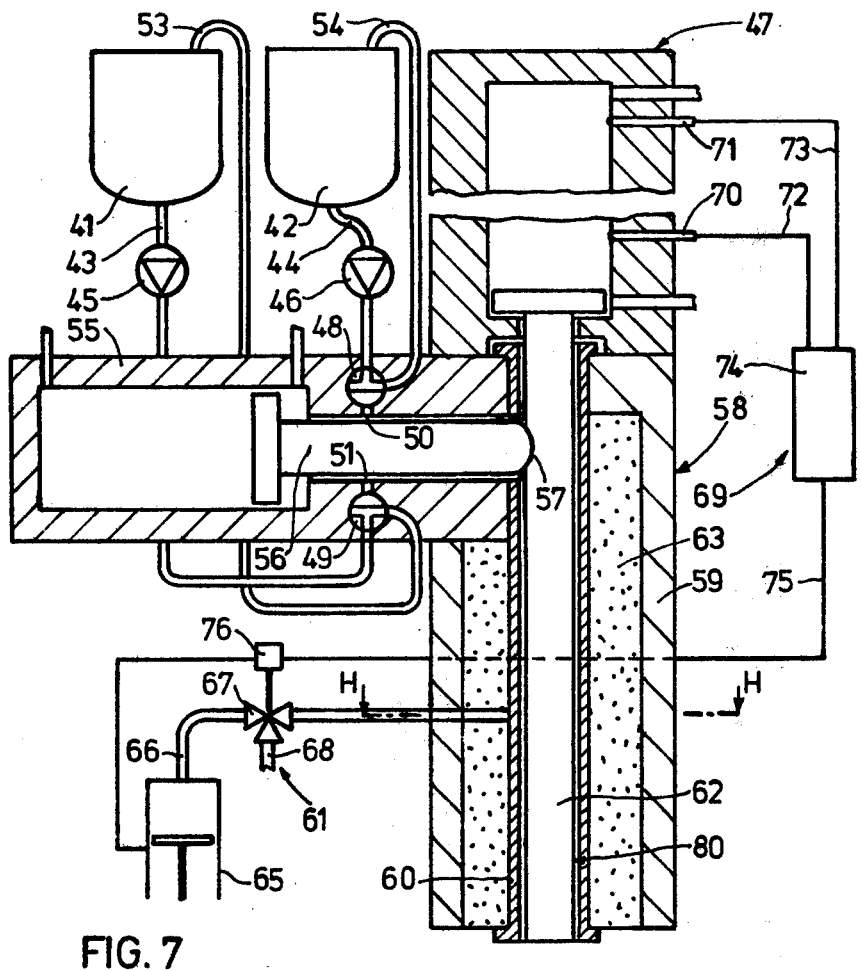
FIG. 7 illustrates the apparatus of FIG. 5 during the cleaning phase.
Figure 8:
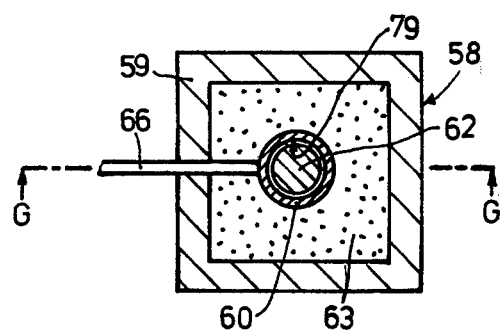
FIG. 8 is a view of FIG. 5 along plane H—H.
Figure 9:
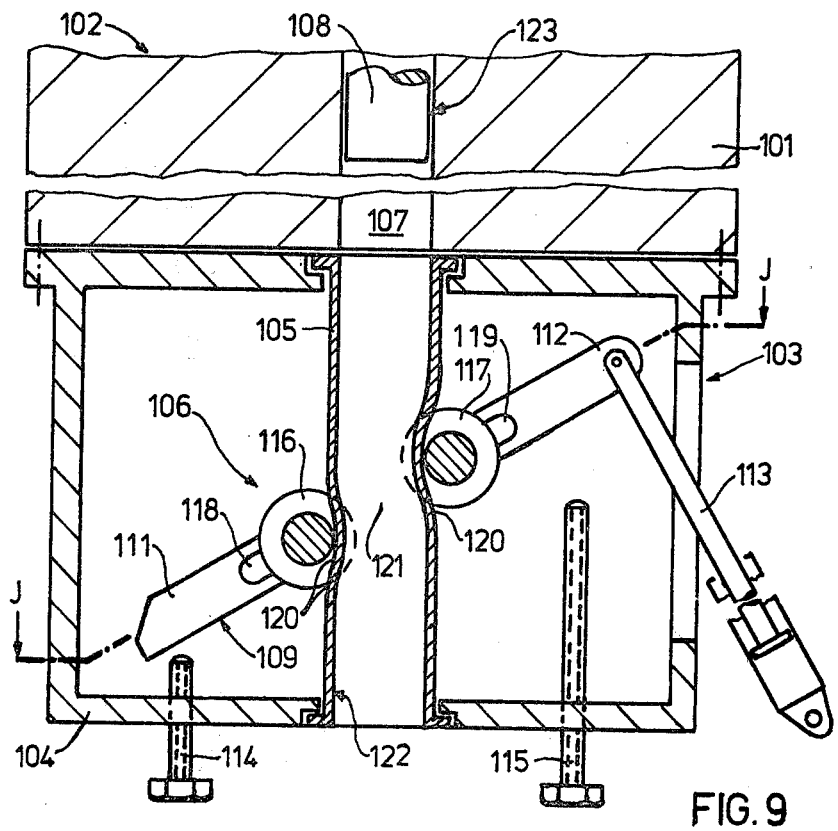
FIG. 9 represents the outlet part of a third embodiment of the present invention during the mixing phase.
Figure 10:
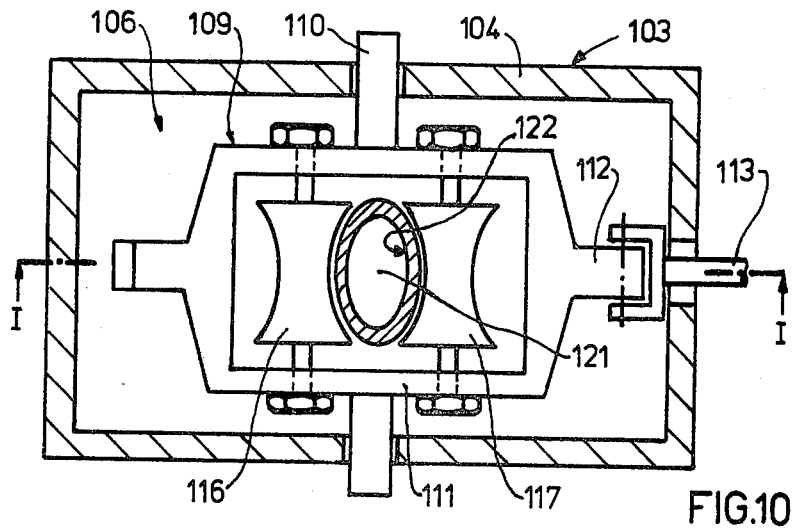
FIG. 10 is a view of FIG. 9 along plane J—J.

The apparatus functions in the following manner: FIGS. 5 and 6 illustrate the mixing phase position. The outlet piston 56 has returned and the two-way valves 48 and 49 are positioned at "mixing," so that the components are conveyed into the mixing chambers 52 from the reservoirs 41 and 42 by the metering pumps 45 and 46 and are mixed in the chamber by injection. Upon issuing from the outlet opening 57, the reaction mixture, in undergoing a right-angled deflection, passes into the outlet tube 60, since the ejection piston 62 has returned a sufficient distance that the outlet opening 57 is clear. The deflection device 61 is already in its working position, because the extension piston 62 activated the contact switch 71 upon its return, and the switch 71 has released a command to the servo-motor 76 via the control relay 74 to connect the compressor 65 and to adjust the valve 67 for charging the pressure chamber 64. Once the desired pressure has been attained in the pressure chamber 64, the valve 67 closes and the compressor is automatically disconnected. During this operation, the outlet tube 60 undergoes a deflection 77 with a simultaneous deformation 78 in the region of the pressure chamber 64, as a result of which, the flow of mixture has to take a curved path and is constricted. The flow speed in the outlet tube 60 is approximately from 10 to 60 m/sec in the narrowest cross section and approximately from 0.5 to 10 m/sec at the outlet. In order to complete the mixing procedure, the reversing valves 48 and 49 switch over and connect the supply lines 43 and 44 with the return lines 53 and 54. The ejection piston 56 empties the mixing chamber 52 and at the same time fills it. The ejection piston 62 now empties the outlet tube 60 by pushing the mixture out, and releases a pulse in the control device 74 via the contact switch 70 which commands the servomotor 76 to switch over to "deaeration." The advancing ejection piston 62 expels the remaining air from the compression chamber 64 and completely empties the outlet tube 60. The elasticity of the packing 63 is adjusted such that the free cross section of the outlet tube 60 in the cleaning phase is slightly smaller than the cross section of the ejection piston 62. As a result of the stretching which occurs, the inside wall 79 of the outlet tube 60 adopts the circumferential contour 80 of the ejection piston 62, thus ensuring a clean stripping action on the inside wall 79. The next mixing procedure is introduced by the return of the ejection piston 62 upon passing the contact switch 70 of the control device 69, the pressure chamber 64 is again charged, with a corresponding changeover of the valve 67 and the next mixing procedure takes place after the ejection piston 56 has returned and after the two-way valves 48 and 49 have switched over to "mixing."

In the embodiment of FIGS. 9 to 12, an outlet part 103 is flange-mounted to the indicated end 101 of the mixing head 102. The outlet part 103 comprises a housing 104 in which is positioned an elastic outlet tube 105 with a deflection device 106. The outlet tube 105 is connected to the outlet of the mixing chamber 107, so that they are provided with a common ejection piston 108. The deflection device 106 comprises a double rocker arm 109, the rotary shaft 110 of which extends in a direction perpendicular to the center line of the outlet tube 105. The rotary shaft 110 is mounted in the housing 104 (FIGS. 10 and 12) and supports a frame-like rocker 111 through which is guided the outlet tube 105. One of the ends 112 of the rocker 111 is hinged to a hydraulically-operable piston rod 113. Manually adjustable stops 114 and 115 restrict the swiveling angle of the rocker 111. Contoured rollers 116 and 117 are adjustably and exchangeably-mounted in the rocker 111 in slots 118 and 119 on both sides of the outlet tube 105.

Figure 11:
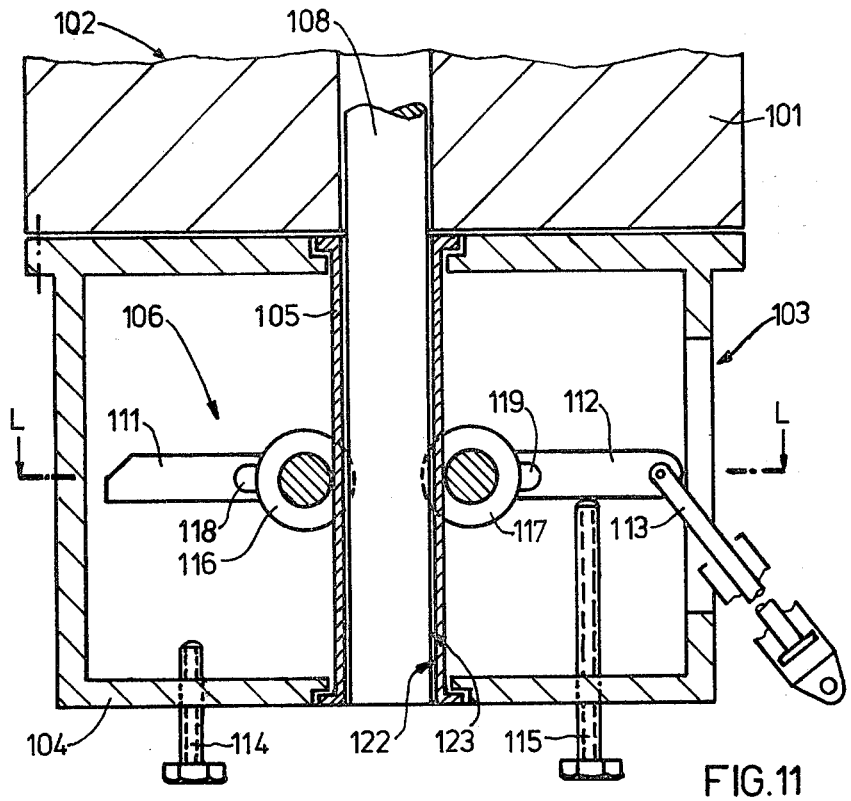
FIG. 11 illustrates the apparatus of FIG. 9 during the cleaning phase.
Figure 12:
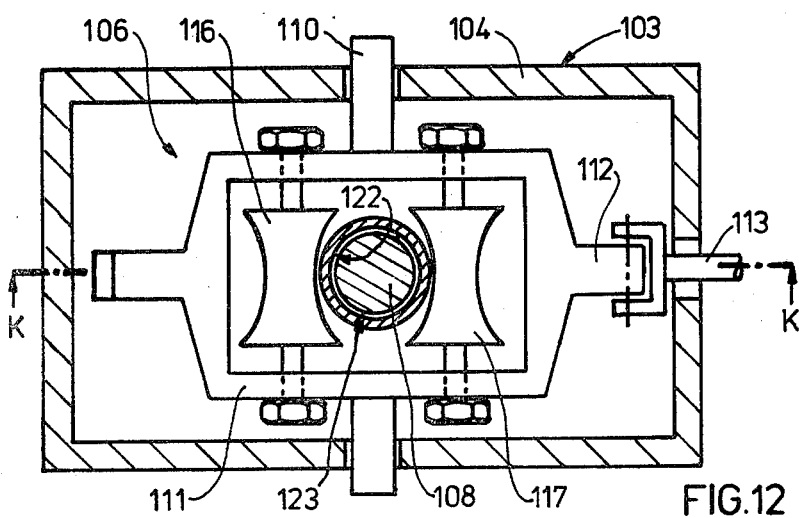
FIG. 12 is a view of FIG. 11 along plane L—L.

Depending on the spacing of the rollers 116 and 117 from each other, a smaller or greater deflection 120 may be achieved independently of the swiveling angle. The spacing of the rollers from the rotary shaft 110 may be adjusted both symmetrically and asymmetrically depending on the type of deflection 120 or deformation 121 which is required. In FIGS. 11 and 12, the inside wall 122 of the outlet tube 105 adopts the circumferential contour 123 of the ejection piston 108.

Figure 13:
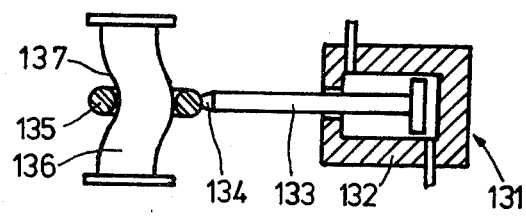
FIG. 13 represents, in longitudinal section, a hydraulically-driven deflection device operating with traction.

According to FIG. 13, the deflection device 131 comprises a traction rammer 133 guided in a hydraulic housing 132, and a ring 135 is positioned on the head 134 of the traction rammer 133 which surrounds the outlet tube 136 and is firmly connected therewith. The deflection is denoted by reference numeral 137.

Figure 14:
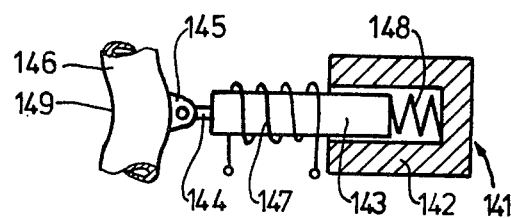
FIG. 14 represents, in longitudinal section, a deflection device operating electromagnetically with a pullback spring.

According to FIG. 14, an electromagnetically-operating deflection device 141 comprises a traction rammer 143 guided in a housing 142, the head 144 of which is secured a fishplate 145 of the outlet tube 146. The traction rammer 143 is surrounded by an induction coil 147 and operates against a restoring spring 148 mounted in the housing 142. The deflection is denoted by numeral 149.

Figure 15:
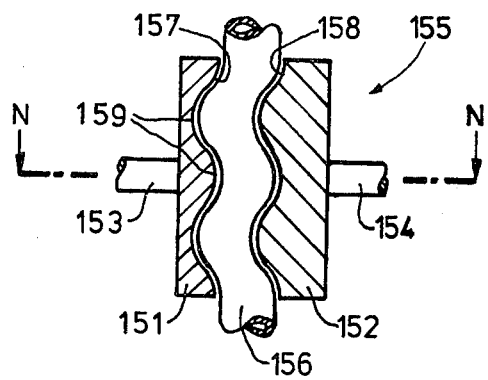
FIG. 15 illustrates one embodiment of a deflection device during the mixing phase.
Figure 16:
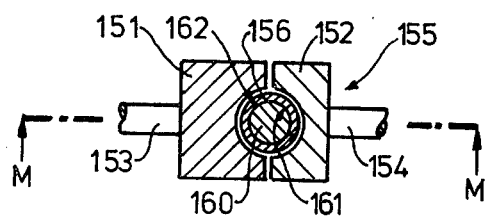
FIG. 16 is a view of FIG. 15 along plane N—N.

FIGS. 15 and 16 illustrate the heads 151 and 152 of two rammers 153 and 154 of a deflection device 155, which may be moved towards each other. These heads 151 and 152 surround the outlet tube 155 in semicircular manner and have groove-like contours 157 and 158 in the longitudinal section (FIG. 15), the outlet tube 156 adapting thereto. Thus, there are, in this case, several deflections 159, without there being a deformation of the outlet tube 156 in the sense of a change in the throughflow cross section. At a start of the cleaning phase, the traction rammers 153 and 154 may be returned to such an extent that the outlet tube 156 is no longer in contact with the heads 151 and 152 or with the contoured surface 157 and 158 thereof, upon penetration of the ejection piston 160. The inside wall 161 of the outlet tube 156 adopts the circumferential contour 162 of the ejection piston 160.

Figure 17:
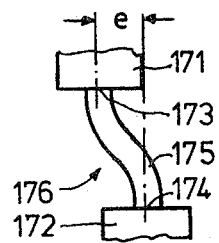
FIGS. 17 to 20 illustrate two other embodiments of the present invention during the mixing phase (FIGS. 17 and 19) and during the cleaning phase (FIGS. 18 and 20)
Figure 18:
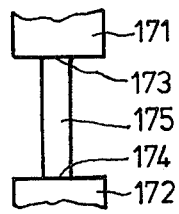

In FIGS. 17 and 18, the mixing head 171 may be transversely displaced by the distance "e" with respect to the molding tool 172 and this distance "e" characterizes the parallel spacing of the outlet opening 173 of the mixing chamber and of the outlet opening 174 of the outlet tube 175 during the mixing phase. The deflection 176 is caused by the displacement of the mixing head 171.

As an alternative, the original shape of the outlet tube 175 could be that shown in FIG. 17. During the cleaning phase, the predetermined deflection 176 can be eliminated by transverse displacement of the mixing head 171 and/or of the molding tool 172 by the distance "e" by straightening the outlet tube 175 connected therewith. However, different materials of suitable stretchability or ability to be buckled have to be selected for the two alternatives for the outlet tube 175 in order to meet the different types of stresses.

Figure 19:
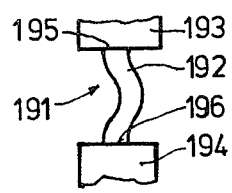
Figure 20:
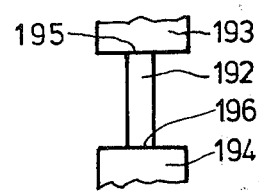

The embodiment according to FIGS. 19 and 20 substantially corresponds to that of FIGS. 17 and 18, but with the difference that the deflection 191 of the outlet tube 192 does not take place due to transverse displacement of the mixing head 193 and/or of the molding tool 194, but by a vertical displacement towards each other. During the mixing phase, as opposed to the cleaning phase, the outlet opening 195 of the mixing chamber and the outlet opening 196 of the outlet tube 192 are in different positions with respect to each other.

Figure 21:
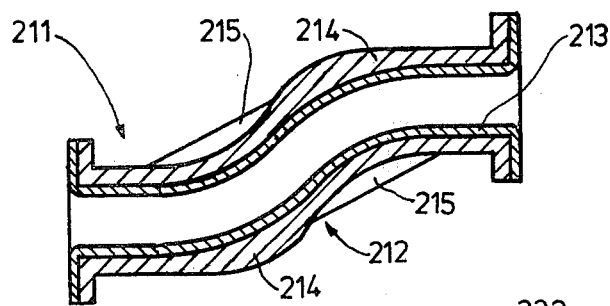
FIGS. 21 and 22 illustrate two embodiments of the outlet tube of the present invention.

In FIG. 21, the outlet tube 211 is in its normal shape. That is, it is premolded to provide the required deflection 212. It is provided with an internal liner 213 and has thickenings 214 in its wall. Ribs 215 produce a further fixed reinforcement at specific points which ensures an adequate inherent stability during the throughflow of the reaction mixture, while ensuring an adequate flexibility of the outlet tube 211 during the entrance of the ejection piston.

Figure 22:
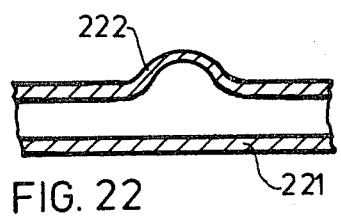

In FIG. 22, the outlet tube 221 has an intermediate section 222 having one segment of greater extensibility than the remaining part.

EXAMPLE

The apparatus in the embodiment according to FIGS. 1 through 4 is used.

The mixing chamber 12 and the outlet tube 20 have a diameter of 18 mm, or a free throughflow cross section of about 250 mm$^2$. Before the start of the mixing phase, the outlet tube 20 is deflected laterally by 18 mm under the influence of deflection device 21. During this operation, a deformation simultaneously takes place which constricts the free throughflow cross section at this point to about 25 mm$^2$. In order to stabilize the outlet tube 20, a pressure of 1.5 bar is adjusted in the pressure chamber 36. 250 cm$^3$/sec each of polyol and isocyanate are conveyed out of the reservoirs 1 and 2, respectively, into the mixing chamber 12 by the metering pumps 5 and 6. A dynamic pressure of about 5 bars is set in the mixing chamber. A reaction mixture is produced having a viscosity of 800 mPas. The mixture throughput amounts to 500 cm$^3$/sec at an outlet speed of 2 m/sec at the outlet opening 24 of the outlet tube 20. The reaction mixture emerges in a stabilized, laminar flow.

At the end of the mixing time interval which has been set, the reversing valves 8 and 9 switch to a circular course and the ejection piston 16 empties the mixing chamber 12 and the outlet tube 20. During this operation, the rammer 26 is returned by the forwards force of the ejection piston 16, so that the inside wall 34 of the outlet tube 20 adopts the circumferential contour 35 of the ejection piston 16. When the ejection piston 16 returns to the mixing position, the outlet tube 20 is again automatically adjusted due to the force of the spring 30 acting on the rammer 26.

What is claimed is:

1. An apparatus for the production of a flowable reaction mixture of at least two flowable components which mixture forms a foam or solid material, comprising:
   (a) storage means for said components;
   (b) supply lines leading from the storage means via metering pumps to a mixing head;
   (c) said mixing head having a mixing chamber;
   (d) injection openings connected to said supply lines and opening into said mixing chamber;
   (e) said mixing chamber having an outlet opening downstream of said injection openings;
   (f) said outlet opening having an elastic outlet tube whose throughflow cross section may be varied connected thereto;
   said apparatus further characterized in that:
   (g) the outlet tube has at least one means associated therewith for deflecting said outlet tube;
   (h) an ejection piston is associated with said outlet tube, which piston is capable of filling the outlet tube; the contour of the inside wall of said outlet tube corresponding to the external contour of said ejection piston.

2. The apparatus of claim 1, characterized in that the outlet tube is arranged on the longitudinal axis of the mixing chamber and the ejection piston is also capable of filling the mixing chamber.

3. The apparatus of claim 1, characterized in that the outlet tube is connected to the outlet opening of the mixing chamber at an angle thereto, said mixing chamber being provided with its own ejection piston.

4. The apparatus of claim 1, characterized in that said deflecting means comprises a transversely-displaceable rammer.

5. The apparatus of claim 1, characterized in that said deflecting means comprises a rocker arm.

6. The apparatus of claim 1, characterized in that said deflecting means comprises a supported pressure chamber which only partly surrounds the outlet tube.

7. The apparatus of claim 1, characterized in that the outlet tube has means for retaining its original shape during the mixing phase.

8. The apparatus of claim 1, characterized in that means are provided for aligning the outlet opening of the mixing chamber and the outlet opening of the outlet tube in different positions with respect to each other during the cleaning phase when compared with the mixing phase.

* * * * *